Feb. 13, 1934.    R. F. SCHNEIDER    1,947,175
THERMOMETER
Filed Oct. 1, 1932
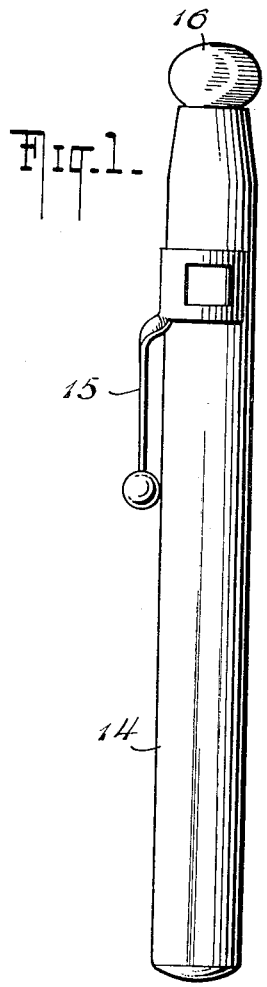
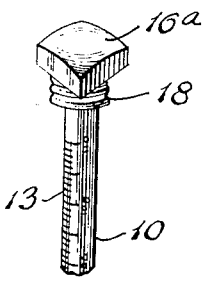
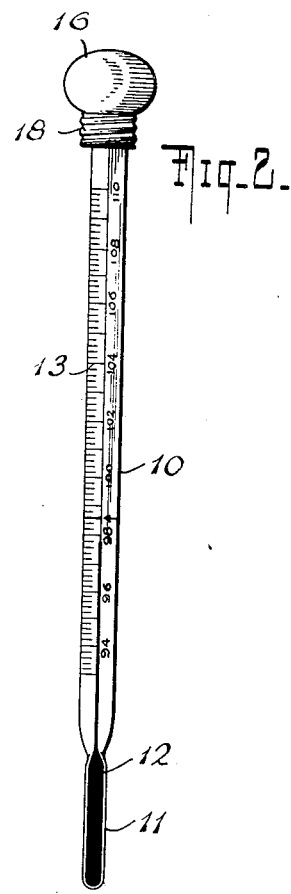
INVENTOR
RALPH F. SCHNEIDER
BY
ATTORNEYS Patented Feb. 13, 1934

1,947,175

UNITED STATES PATENT OFFICE 1,947,175

THERMOMETER

Ralph F. Schneider, Jersey City, N. J.

Application October 1, 1932. Serial No. 635,739

3 Claims. (Cl. 206—16.5)

My invention relates to thermometers and more particularly to clinical thermometers of the type which are contained in tubular pocket cases when not in use. In existing forms, the thermometers are carried in cases which are closed by independent caps removably connected with the cases, while in other forms available at the present time, the thermometers are connected with the casing caps and are removable therewith. The first mentioned existing form requires the cap and the thermometer to be independently handled in the removal of said thermometer from and its insertion into the case. In the second mentioned existing form the connection between the cap and the thermometer becomes insecure after a comparatively short time, so that the possibility exists that during the shaking of said thermometer to restore the mercury to the bulb the thermometer will become disconnected from the cap and broken. In both of the existing forms mentioned the identity of thermometer with respect to the use for which it is designed or to which it is put by the physician or other user is completely hidden when the thermometer is contained in its casing and the thermometer accordingly must be first removed from said casing before its identity can be determined.

The object of the invention is to provide a novel and simple construction in which the objections and disadvantages of the aforesaid available forms are overcome and in which a portion of the thermometer itself may act as a closure for the casing and thus avoid the necessity for either an independent cap or a cap attached to the thermometer. The invention further contemplates the provision of an improved arrangement in which the identity of the thermometer with respect to its use is clearly disclosed when said thermometer is combined with its case, without requiring its removal from said case to permit identification of the thermometer. Other more specific objects of the invention will appear from the description hereinafter and the features of novelty will be pointed out in the claims.

In the accompanying drawing, which illustrates several examples of the invention without defining its limits, Fig. 1 is an external view of the thermometer in position in its case; Fig. 2 is a view of the thermometer removed from the case; Fig. 3 is a fragmentary perspective of another form of the thermometer; Fig. 4 is a fragmentary view, partly in section on an enlarged scale of the form shown in Fig. 1, and Fig. 5 is a fragmentary sectional view showing another form of the thermometer and case.

In all of its forms the invention comprises a thermometer and a casing in combination with co-operating means on the casing and thermometer whereby the latter is removably fixed in said casing, and with means on the thermometer whereby the identity of said thermometer, when contained in the casing, is visibly indicated without requiring removal of said thermometer from the casing for purposes of identification, and whereby, in some forms, the casing is sealed to protect the encased thermometer against contamination.

As shown in the drawing, the thermometer or more specifically, the clinical thermometer may, generally speaking, be of any well known construction and comprises the customary tube 10 provided at its one end with the usual bulb 11 containing mercury or other expansible indicating medium 12, which is adapted in the well known way to move lengthwise of the tube 10 for co-operation with the conventional scale 13 thereon to indicate temperatures. The casing 14 likewise may be made, generally speaking, of any existing form and as shown comprises a tubular container, the one end of which is normally open; any suitable material may be utilized in the construction of said casing 14 which, as shown in Fig. 1, may be provided with a clip 15 of well known form adapted to clamp the casing 14 and the thermometer therein in the pocket of the physician or other user. At its one end the thermometer 10 is provided with means located exteriorly of the normally open end of the casing 14 when the thermometer 13 is in place therein, said means having a distinctive characteristic for indicating the identity of the encased thermometer.

In the form illustrated in Figs. 1, 2 and 4 of the drawing, this means comprises a projection or head 16 of approximately spherical form and constructed of any suitable material capable of being intimately connected with the tube 10 of the thermometer. In the preferred form the head or projection 16 is constructed of glass, either as an integral part of the thermometer tube 10, or as a separate element fused thereto. The previously mentioned distinctive characteristic may reside in the shape of the head or projection 16, or the latter may be colored in various ways to designate the identity of the thermometer of which it forms a part, or both shape and coloring may be relied upon to perform this function. For instance, the distinctive shape of the head or projection 16 or the color thereof, or both, may indicate to the physician or other person that the thermometer is a mouth thermometer, a rectal thermometer or a thermometer used by the physician or other person on patients afflicted with contagious diseases. Obviously, the head or projection 16 may be other than approximately spherical in form, as shown for instance in Fig. 3, in which the projection or head 16a is of approximately rectangular or more specifically cubical form; in this latter case, the projection or head 16a is preferably connected with the thermometer tube 10 by fusing, although it may constitute an integral part of said tube, as will be apparent. In any case the head or projection 16a in addition to its distinctive form may also be colored in various ways to impart thereto the distinctive characteristic whereby the identity of the thermometer as to use and purpose is established.

In addition to the above, the casing and thermometer in all forms of the improved arrangement are provided with co-operating means for removably fixing the thermometer in the casing 14 so that the tube 10 will be completely encased therein and protected against contamination from external sources. As shown in Figs. 1 to 4 inclusive, the means last mentioned consists of internal screw-threads provided in the casing 14, preferably at the open end thereof and external co-operating screw-threads provided on the thermometer, preferably in close proximity or in actual engagement with the head or projection 16 or its equivalent. In the specific arrangement illustrated in Fig. 4 of the drawing, the internal screw-threads are formed in the casing 14 by fixing therein a screw-threaded sleeve 17, preferably made of metal or other suitable material and secured in place in the casing 14 in any conventional manner.

The external co-operating screw-threads on the thermometer tube 10 in the illustrated form are provided by means of a screw-threaded collar 18 of metal or other suitable material, which collar 18 is preferably fixed in place on the tube 10 by means of a collar 19 of rubber or other resilient material. In the preferred construction the resilient collar 19 is forced upon the tube 10 and securely fixed in place thereon by means of cement or other adhesive; the screw-threaded collar 18 is similarly forced over the resilient collar 19 and may likewise be securely fastened in place thereon by cement or other conventional adhesive. In any case, the screw-threaded collar 18 and the resilient collar 19 are preferably located in close proximity to or in actual engagement with the head or projection 16, or its equivalent, as clearly illustrated in Fig. 4. It will be understood that the screw-threaded portion of the thermometer shown in Fig. 3 may be similarly constructed and likewise consist of the metallic or other screw-threaded collar 18 and the resilient collar 19. The latter, in addition to securely fixing the screw-threaded collar 18 in place on the thermometer tube 10 acts as a cushion for absorbing forces tending to crush the thermometer tube 10 as the thermometer is screwed into or unscrewed from the casing 14, and in addition, because of its resiliency, maintains the screw-threaded collar 18 in close sealing engagement with the screw-threaded sleeve 17 or its equivalent. It will be obvious that the co-operating screw-threads on the thermometer and on the casing may be provided in other ways than the one shown and described hereinbefore, and that in some cases said screw-threads may be produced directly on the thermometer tube and in the casing, respectively.

Instead of removably fixing the thermometer in the casing 14 by means of the screw-threaded arrangement shown in Figs. 1-4 inclusive, other means suitable for the purpose may be provided. For instance, as shown in Fig. 5, the casing 14 may be provided with an internal seat 17a, while the thermometer may include an external seat 18a adapted to co-operate with the internal seat 17a for removably fixing the thermometer in the casing. In the preferred arrangement, with respect to the form now being described, the internal seat 17a converges inwardly and is located at the open end of the casing 14, while the co-operating seat 18a on the thermometer converges longitudinally thereof and is adapted to frictionally engage the seat 17a with a wedging action, whereby the thermometer is removably fixed in the casing 14. The seat 17a may be formed directly on the casing 14 or in any other suitable manner, while the seat 18a may be produced as an integral part of the thermometer tube 10 or otherwise as may be desired and found convenient; in any case, the external seat 18a is preferably located immediately adjacent to the head or projection 16 or its equivalent.

In the form shown in Figs. 1-4 inclusive, the thermometer may be easily removed from the casing 14 when use of said thermometer is required by simply rotating said thermometer about its axis in a direction to disconnect the screw-threaded collar 18 or its equivalent from the screw-threaded sleeve 17 or its equivalent; likewise, the thermometer may easily be fixed in the casing by rotating the thermometer in the reverse direction to connect the screw-threaded collar 18 or its equivalent with the screw-threaded sleeve 17, or its equivalent. In either case the head or projection 16 or equivalent means provides a convenient medium whereby the rotation of the thermometer to effect disconnection from or connection with the casing 14 may be readily accomplished. In addition to its other functions, the projection or head 16 or 16a enables the physician or other user of the thermometer to firmly grasp the latter for shaking the same in the customary manner to restore or return the mercury to the bulb 11.

In the form shown in Fig. 5, the thermometer is removed from the casing 14 by exerting a pulling force thereon in an outward direction sufficient to separate the seat 18a from the seat 17a; to fix the thermometer in the casing it is simply inserted into the same after which a pushing force in an inward direction is exerted on said thermometer to bring the seat 18a into firm frictional engagement with the seat 17a. During these operations, the projection or head 16 or 16a provides an efficient means for enabling the physician or other user to easily remove the thermometer from the casing 14 or removably fix it therein.

The projection or head 16 or 16a, generally speaking, is sufficiently large in transverse dimension with respect to the open end of the casing 14 to cause it to seal the same as is shown, for instance, in Fig. 4; under such conditions, said head or its equivalent provides an additional factor of safety against contamination of the encased thermometer from sources exterior to the casing 14.

As clearly shown in Figs. 1, 4 and 5, the head or projection 16 or its equivalent is located exteriorly of the open end of the casing 14 when the thermometer is in place therein. With this arrangement, when the casing 14 with the thermometer encased therein is clamped by means of the clip 15 in a vest or other pocket, said head or projection 16 or equivalent means will be clearly visible exteriorly of said pocket so that the identity of the encased thermometer may easily be determined by simply noting the characteristic of the head or projection 16 or equivalent means without requiring the thermometer to be first removed from the casing to establish such identification. The removal of the thermometer from the casing 14 or its insertion into the same and connection therewith may, if desired, be effected without requiring the casing 14 to be removed from the aforesaid vest or other pocket. In addition to this, the novel arrangement in all of its forms avoids the necessity for the independent handling of a casing cap before the thermometer can be removed from or inserted into the casing, as is required in existing forms of encased thermometers; likewise, the improved arrangement avoids the possibility that the thermometer tube 10 may become separated from the head or projection 16 or equivalent means during shaking of the thermometer to return the mercury to the bulb 11 and consequently increases the factor of safety to a maximum extent and practically does away with the possibility of injury to the thermometer during such return of the mercury to the bulb.

The improved construction in all of its forms is extremely simple, and capable of being produced at relatively low cost and requires no particular skill in its use.

Various changes in the specific forms shown and described may be made within the scope of the claims without departing from the spirit of the invention.

I claim:
1. The combination of a casing open at one end and provided with internal screwthreads at said open end, a thermometer adapted to be encased in said casing, a head located at one end of said thermometer and forming an integral part thereof, and a screwthreaded collar independent of said head in fixed position upon said thermometer in proximity to said head for co-operation with said internal screwthreads to removably fasten said thermometer in said casing with said head located exteriorly thereof.

2. The combination of a casing open at one end, a screwthreaded sleeve interiorly fixed in said casing at said open end, a thermometer adapted to be encased in said casing, a resilient collar fixed on said thermometer, and a screwthreaded metallic collar secured on said resilient collar for co-operation with said screw-threaded sleeve to removably fix said thermometer in said casing.

3. The combination of a casing open at one end and provided with internal screwthreads at said open end, a thermometer adapted to be encased in said casing, a projection at one end of said thermometer located exteriorly of said normally open end of said casing when the thermometer is in place therein, said projection having a distinctive characteristic for indicating the identity of the encased thermometer, a rubber collar cemented to said thermometer in engagement with said projection, and a screwthreaded collar cemented to said rubber collar for co-operation with the internal screwthreads of said casing to removably fix the thermometer therein.

RALPH F. SCHNEIDER.